(12) United States Patent
Perentes et al.

(10) Patent No.: US 10,517,425 B2
(45) Date of Patent: *Dec. 31, 2019

(54) SYSTEM FOR PREPARING FOOD OR BEVERAGES FROM A PACK

(71) Applicant: NESTEC S.A., Vevey (CH)

(72) Inventors: Alexandre Perentes, Pully (CH); Youcef Ait Bouziad, Echandens (CH)

(73) Assignee: Societe des Produits Nestle S.A., Vevey (CH)

( * ) Notice: Subject to any disclaimer, the term of this patent is extended or adjusted under 35 U.S.C. 154(b) by 107 days.

This patent is subject to a terminal disclaimer.

(21) Appl. No.: 15/524,713

(22) PCT Filed: Oct. 27, 2015

(86) PCT No.: PCT/EP2015/074854
§ 371 (c)(1),
(2) Date: May 5, 2017

(87) PCT Pub. No.: WO2016/071156
PCT Pub. Date: May 12, 2016

(65) Prior Publication Data
US 2017/0347831 A1 Dec. 7, 2017

(30) Foreign Application Priority Data
Nov. 6, 2014 (EP) .................................... 14191975

(51) Int. Cl.
*A47J 31/44* (2006.01)
*B65D 75/58* (2006.01)
*B65D 85/804* (2006.01)

(52) U.S. Cl.
CPC ...... *A47J 31/4492* (2013.01); *B65D 75/5872* (2013.01); *B65D 85/8043* (2013.01); *B65D 2203/00* (2013.01)

(58) Field of Classification Search
CPC ............ B65D 84/8043; B65D 75/5883; B65D 75/5872; B65D 2203/00; A47J 31/407; A47J 31/4492
See application file for complete search history.

(56) References Cited

U.S. PATENT DOCUMENTS 6,698,333 B2 * 3/2004 Halliday ............. A47J 31/4492
426/77
7,597,922 B2 * 10/2009 Cheng ..................... A23L 27/00
426/594

(Continued)

FOREIGN PATENT DOCUMENTS

| CN | 1576020 A | 2/2005 |
|---|---|---|
| CN | 103596474 A | 2/2014 |

(Continued)

OTHER PUBLICATIONS

Chinese Patent Office Communication for Application No. 201580059688.3 dated Aug. 30, 2019 (17 pages).

*Primary Examiner* — Eric Keasel
(74) *Attorney, Agent, or Firm* — K&L Gates LLP

(57) ABSTRACT

The invention refers to a pack (10) for preparing food or beverage products comprising: at least one container (10') having an inner volume where at least one base ingredient for the preparation of the food or beverage product is stored, said inner volume being defined by sheets of material joined to one another at their edges; a fitment assembly (20) through which the food or beverage product is delivered, and identification 10 means (30) comprising the information on the food or beverage product to be prepared; the identification means (30) being arranged in the fitment assembly (20), particularly in a free area of the fitment assembly (20) where they can be reliably read.

18 Claims, 12 Drawing Sheets

(56) References Cited

U.S. PATENT DOCUMENTS

| | | | | |
|---|---|---|---|---|
| 7,658,286 | B2* | 2/2010 | Murray | B65B 43/04 |
| | | | | 206/459.1 |
| 8,459,179 | B2* | 6/2013 | Ozanne | A47J 31/407 |
| | | | | 426/232 |
| 2010/0078480 | A1* | 4/2010 | Aker | G06K 19/06009 |
| | | | | 235/462.08 |
| 2011/0100506 | A1* | 5/2011 | Zabludovsky-Nerubay | |
| | | | | B65D 75/5883 |
| | | | | 141/94 |
| 2012/0210879 | A1* | 8/2012 | Mariller | B65D 85/8043 |
| | | | | 99/295 |

FOREIGN PATENT DOCUMENTS

| | | |
|---|---|---|
| CN | 103945739 A | 7/2014 |
| DE | 4341335 C1 | 11/1994 |
| WO | 0158786 | 8/2001 |
| WO | 2007102142 A1 | 9/2007 |
| WO | 2011054402 A1 | 5/2011 |
| WO | 2014125123 | 8/2014 |
| WO | 2016023729 A1 | 2/2016 |

* cited by examiner

SYSTEM FOR PREPARING FOOD OR BEVERAGES FROM A PACK

CROSS REFERENCE TO RELATED APPLICATIONS

The present application is a National Stage of International Application No. PCT/EP2015/074854, filed on Oct. 27, 2015, which claims priority to European Patent Application No. 14191975.3, filed on Nov. 6, 2014, the entire contents of which are being incorporated herein by reference.

FIELD OF THE INVENTION

The present invention relates to a system for preparing food or beverages from a pack, in particular a flexible pack, which comprises the food or beverage base ingredients:

the pack also comprises identification means having the information on the process parameters to be applied to the food or beverage base ingredients so that an optimised product is delivered.

BACKGROUND OF THE INVENTION

Preparing food or beverages from flexible packs or containers which comprise the food or beverage ingredients is known in the state of the art, such as per documents WO 99/05044 or WO 2011/024103 for example. These flexible containers or packs have generally the advantage to semi-rigid and rigid containers, typically with the shape of a capsule, that less amount of material is used to pack the product which leads to overall less production costs, to lower life cycle impacts shown in several life-cycle assessments and to advantages on the part of the user, who will need less available space for storing these packs, as they are more compact.

In order to allow a correct preparation of the food or beverage product from the food or beverage base ingredients which are comprised in these flexible packs or containers, identifiers comprising data for the process to be applied are provided: for example, document WO 2005/063091 A1 discloses a system for preparing a beverage departing from a container which can be a flexible bag comprising a plurality of coffee pouches, the container comprising an identifier with data for the brewing process to be applied to obtain the beverage. However, these identifiers can be damaged or can for example contain errors, in which case the system will not be able to correctly read the information and typically, a default brewing process will be applied, resulting in a non-optimised final product for the consumer. Moreover, this document describes that the identifier comprises an element which is detached from the container or which is provided separately from the container, this element comprising the data for the brewing process to be applied. The problem of these configurations is that the consumer needs to either torn and detach the element carrying the data or needs to introduce this separate element together with the container in the machine, which makes the process not comfortable from the user's point of view.

Therefore, it would be desirable to provide a system for preparing food or beverages in an optimised way departing from a flexible pack or container which comprises the data for the correct processing of these ingredients, such that the system is able to read the data in a reliable manner and minimising any possibility of errors. Moreover, it is also an object of the present invention to provide a system which is easy and comfortable to use for the consumer.

The present invention comes to provide a solution to the above-described needs, as it will be further explained. The invention also aims at other objects and particularly at the solution of other problems as will appear in the rest of the present description.

SUMMARY OF THE INVENTION

In a first aspect, the invention relates to a pack for preparing food or beverage products comprising: at least one container having an inner volume where at least one base ingredient for the preparation of the food or beverage product is stored, said inner volume being defined by sheets of material joined to one another at their edges; a fitment assembly through which the food or beverage product is delivered, and identification means comprising the information on the food or beverage product to be prepared; the identification means being arranged in the fitment assembly, particularly in a free area of the fitment assembly where they can be reliably read.

Preferably, the fitment assembly further comprises at least one fluid inlet through which fluid enters the pack; the identification means being arranged at least on one side of the fitment assembly with respect to the fluid inlet.

According to another embodiment, the identification means can be arranged on both sides of the fitment assembly with respect to the fluid inlet, the identification means being arranged so that part of the information of the food or beverage product is on one of the sides and is continued on the other side. Preferably, the identification means are further configured to comprise a plurality of times the information on the food or beverage product.

Typically, the identification means are arranged in the fitment assembly so as to be reversibly read independently on the sense in which the pack has been introduced in a preparation device. The identification means can be arranged on the frontal part of the fitment assembly and on the rear part of the fitment assembly.

Preferably, the identification means comprise punched holes configured as a punched-hole code.

According to one embodiment, the identification means are configured either as an optically-read code or as a mechanically-detected code.

Preferably, the identification means for use with a pack as described previously comprise the information on the process parameters to process the base ingredients in the container or containers. These process parameters are at least one or a combination of the following: temperature of a fluid introduced in the single or plurality of containers, total volume of fluid and fluid flow introduced in the single or plurality of containers. Typically, the identification means further comprise the information on the sequential processing of the containers, when the pack comprises a plurality of containers.

According to another aspect, the invention relates to a range of packs wherein the packs differ by the value of their total volume height sharing a common lower part of height $h_0$, the identification means being arranged in said common lower part.

Yet according to another aspect, the invention refers to a system for preparing a food or beverage product, comprising a pack as previously described and a device where the product is prepared, the device comprising a data reader configured to be confronted with the identification means in the pack when the pack is positioned in the device.

Preferably, the data reader comprises a light emitter device to retrieve the information on the product from the identification means in the pack. According to another embodiment, the data reader comprises a plurality of pins engaging with the identification means in the pack.

Preferably, the fitment assembly of the pack is configured so as to confront the data reader in the device with the identification means when the pack is positioned in the device.

According to the invention, the identification means comprise the information on the process parameters to process the base ingredients in the container or containers in the device.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1A:
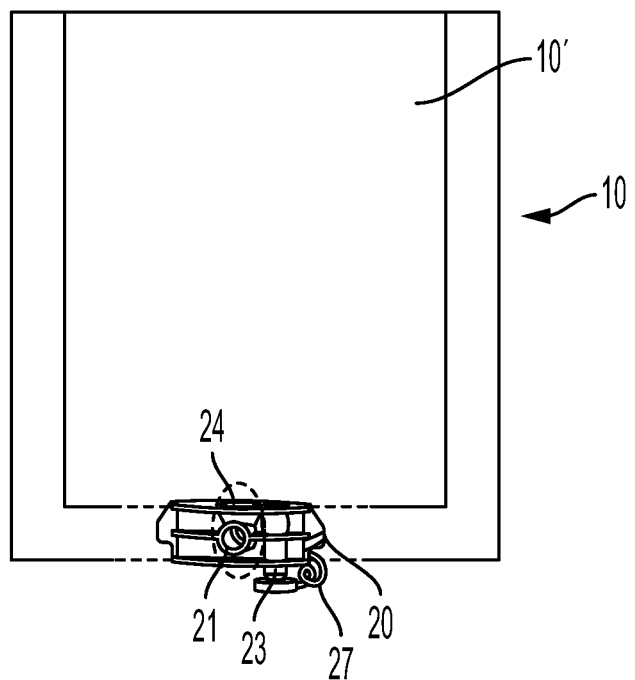
FIG. 1a shows a general view of a pack comprising one container and a fitment assembly for use in a system for preparing food or beverages according to the present invention.

The present invention relates to a system 100 for preparing food or beverages from a pack 10, preferably a flexible pack. The pack 10 comprises the food or beverage base ingredients which will be processed inside the pack in order to obtain the final food or beverage product. As it will be further explained in detail, the pack 10 also comprises identification means 30 comprising the information on the process parameters to be applied to the food or beverage base ingredients so that an optimised product is delivered. The system 100 of the invention also comprises a device 40 for preparing the food or beverages from the pack 10.

According to the present invention the food or beverage base ingredients of the pack can be comprised within the list of: soups, fruit juices, vegetable juices, bouillons, coffee, chocolate, tea, milk or creamer, smoothies, purees, coulis, creams or a combination thereof. The food or beverage base ingredients can be a soluble food or beverage ingredient. Preferably the food or beverage ingredient is a soluble food or beverage ingredient selected in the list of:
- instant coffee powder, milk powder, cream powder, instant tea powder, cocoa powder, soup powder, fruit powder or mixture of said powders,
- a coffee concentrate, a milk concentrate, a syrup, a fruit or vegetable concentrate, a tea concentrate, a fruit or vegetable puree.

The powders can be agglomerated or sintered. The powders or liquid concentrates can be mixed with solid pieces for example for preparing soups with solid pieces. The food or beverage ingredient can also be an infusable food or beverage ingredient like a roast and ground coffee or tea leaves. In that embodiment water extracts the infusable ingredient.

In the present invention fluid covers any aqueous diluent that can be mixed with a soluble beverage ingredient to prepare a beverage or with a food ingredient to prepare a food product, like water, carbonated water, milk, etc. However, according to the invention, water is the preferred fluid which will be used.

The pack 10 used in the system 100 of the invention preferably comprises two flexible water impermeable sheets joined to one another to define an inner volume where at least one ingredient for the preparation of a food or beverage product is stored. The pack 10 comprises at least one container 10', though it can also comprise a plurality of containers 10', 10'', 10''', etc. when a multiple product is to be prepared. In the case of a multiple product preparation from a pack 10, the pack 10 will comprise a plurality of containers, each container comprising at least one of the food or beverage ingredients for the preparation of the final multiple product: this has the advantage of storing the different ingredients separately so that they are well preserved during storage until the moment they are prepared.

Preferably, the pack 10 presents an essentially plane shape, the pack itself being substantially flexible and looking like a pouch or sachet. By flexible, it is meant that the sheets can be bent easily. The resulting pack 10 can be bent also, as it is soft and can be deformed contrary to rigid containers. The flexible sheet material can be plastic laminates, metallised foil or alufoil or fibre base material. According to the invention the two flexible water impermeable sheets can be formed of one single flexible water impermeable sheet folded in half and joined at its free edges.

The pack 10 can also comprise an excrescence enabling its handling by the user or consumer (not shown).

Figure 1B:
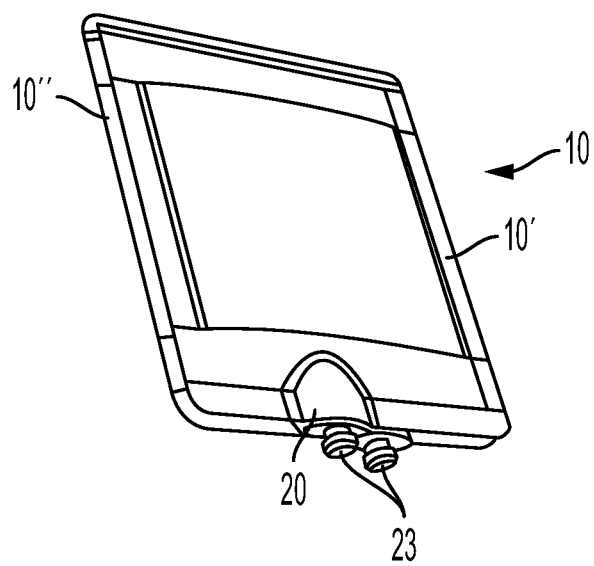
FIGS. 1b and 1c show general views of a pack comprising two containers and a fitment assembly for use in a system for preparing food or beverages according to the present invention.
Figure 1C:
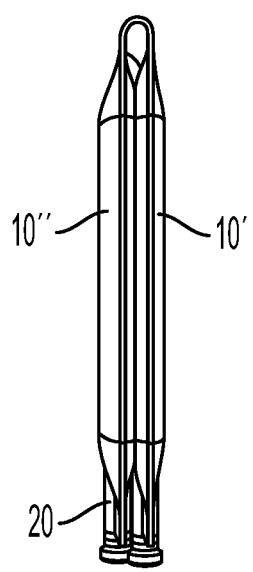

The pack 10 of the invention also comprises a fitment assembly 20: the fitment assembly 20 acts as fluid inlet, through which a fluid is introduced in the pack 10 for the preparation of the food or beverage product, and also acts as product outlet, through which the final food or beverage product is dispensed, once having been prepared. The fitment assembly 20 comprises at least one primary fluid inlet 21 through which fluid is injected in the container of the pack 10, as shown for example in the embodiment represented in FIG. 1a. When the pack 10 comprises a plurality of containers 10', 10", etc. typically when it comprises two containers, 10' and 10", the fitment assembly 20 will then comprise at least one primary fluid inlet 21 (typically arranged on a frontal side of the spout assembly 20) communicating with one container 10' and at least one secondary fluid inlet 22 (typically arranged on a rear side of the spout assembly 20) communicating with another container 10", as represented in FIGS. 1b and 1c. In this case, a multiple food or beverage product is typically prepared and fluid is supplied into the containers 10', 10" sequentially through the primary and secondary fluid inlets 21, 22, as a function of the product to be dispensed, in order to properly mix the ingredients and prepare the corresponding food or beverage product. It is also possible that a fitment assembly 20 comprising a primary fluid inlet 21 and a secondary fluid inlet 22 is used for a pack 10 having only one container 10' (i.e., used for the preparation of a single product): in this case, fluid will be injected into the container 10' either through the primary fluid inlet 21 or through the secondary fluid inlet 22, depending on the side of introduction of the pack 10 in the preparation device. In other words, the fitment assembly 20 will be the same for packs having one or a plurality of containers but, when used in a pack with only one container, then only one of the fluid inlets will be typically used. This has the advantage of repeatability of elements and lower manufacturing and replacement costs for the fitment assembly 20.

In the case of the pack 10 comprising two containers 10' and 10", each of these containers will comprise one base ingredient for the preparation of a final food or beverage product, which will be made out of a recipe combining the ingredients from the two containers. In such an example, the primary fluid inlet 21 is connected to the container 10', whereas the secondary fluid inlet 22 is connected to the container 10": in this case, the fitment assembly 20 is configured so that fluid can be supplied sequentially into the containers, for example first supplying fluid into the container 10' through the primary fluid inlet 21, so a first component of the product is delivered, and secondly supplying fluid into the secondary container 10" through the secondary fluid inlet 22, so that a second component of the product is delivered, in order to prepare the appropriate recipe. Depending on the recipe and therefore on the ingredients in the containers, their processing order is established: proper information on the processing sequence is provided in the identification means 30 as it will be further explained in more detail.

As shown in FIG. 1b or 1c the fitment assembly 20 is preferably arranged in such a way that it brings together the plurality of food or beverage containers, in order to provide a sequential extraction of them.

Preferably, the pack 10 presents an essentially plane shape, wherein the fitment assembly 20 is arranged on one of the sides of the pack 10.

The fitment assembly 20 also comprises at least one dispensing fluid outlet 23 through which the single or multiple product is dispensed. The dispensing fluid outlet 23 is preferably configured so that it delivers the product as a free flow, meaning that the product can flow from the dispensing outlet 23 by simple gravity fall. According to a preferred embodiment of the invention, the dispensing fluid outlet 23 comprises an opening 230 at the bottom of the fitment assembly 20, said opening 230 having a transverse section with a surface area equivalent to the surface of a circular surface of diameter of at least 1 mm, preferably at most 4 mm, even more preferably comprised between 1.5 and 3 mm. The dispensing fluid outlet 23 is typically configured as a straight tube oriented essentially vertically in the fitment assembly 20, comprising at its end an opening 230. The length of the tube is preferably of at least 5 mm. Such a length generally enables a finalisation of the froth of the product, typically a beverage, before it is delivered in a drinking cup. An advantage of using such a dispensing fluid outlet 23 is that there is no need to implement a particular connection between the outlet and the machine when a food or beverage product is produced in order to direct the flow of the product delivered: the food or beverage product can flow from the dispensing fluid outlet 23 directly into a drinking cup or appropriate recipient.

According to the invention, before the food or beverage preparation step, the dispensing fluid outlet 23 is closed at its end. Generally the dispensing outlet is closed by manufacturing and is configured for being opened at food or beverage production step. By "closed by manufacturing" it is meant that a complete pack, comprising the containers and the fitment assembly 20, is manufactured with a closed dispensing fluid outlet 23. This closure guarantees hygienic and shelf life protection. The dispensing outlet 23 can be opened by a machine or manually.

Figure 2A:
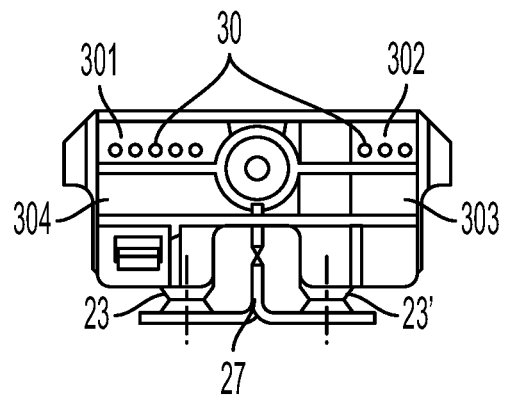
FIGS. 2a, 2b and 2c show different views of a first possible embodiment of a fitment assembly for a pack to be used in a system for preparing food or beverages according to the present invention.
Figure 8:
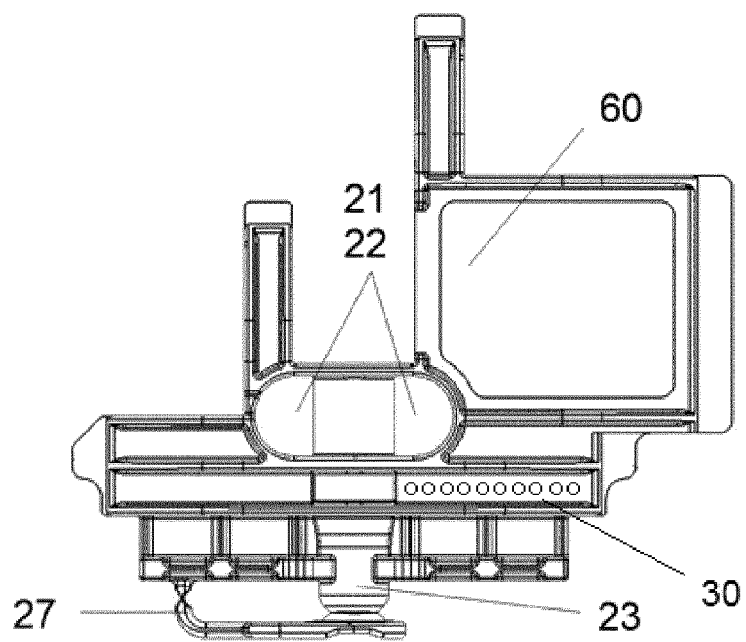
FIG. 8 shows yet another possible embodiment of a fitment assembly for a pack to be used in a system for preparing food or beverages according to the present invention.

Preferably the dispensing fluid outlet 23 is closed by a plug 27, as represented schematically in FIG. 2a or in FIG. 8, for example, said plug 27 comprising means for maintaining it attached to the fitment assembly 20 after the opening of the dispensing outlet 23. Consequently the plug 27 does not fall in the beverage or food during its production. The means for maintaining the plug 27 attached to the fitment assembly 20 can be a plastic bond attached to the fitment assembly 20, for example, or any other suitable means providing a similar effect. Moreover, the dispensing fluid outlet 23 can also comprise a weakened area near the plug 27: this weakened area can be made for example as a narrowing of the dispensing outlet tube so that it is easier to cut or tear off the plug 27 by the machine.

Preferably the plug 27 is part of one single fitment assembly 20 comprising the dispensing outlet and the fluid inlet. In particular when the fitment assembly 20 is made by injection moulding, the design of the mould also comprises the plug 27. In the same manner the plastic bond can also be part of the design of the fitment assembly 20 when it is made by injection moulding, which again provides advantages from a manufacturing point of view, as the same part comprises the fluid inlet, the plug 27 and the bond.

The fitment assembly 20 is preferably rigid and is made of a rigid plastic material, preferably by injection moulding. Typically, this plastic material can be selected from the following: polypropylene, polyethylene, polyethylene terephthalate and polylactic acid. Also according to a less preferred embodiment the fitment assembly 20 can be made of a metal like aluminum or tin-plate.

Preferably, the fluid inlets 21, 22 are piercable by injecting means 41, typically piercing and injecting means 41, preferably a fluid needle, called in what follows needle, such that these injecting means 41 typically comprise an inner duct or pipe through which high pressure fluid is injected in the fluid inlets 21, 22. However, it is also possible that these fluid inlets 21, 22 are directly accessible by injecting means which will inject fluid directly without the need to pierce any external lid or membrane in these fluid inlets.

Preferably, fluid is injected at a pressure higher than 2 bar, more preferably higher than 3 bar, preferably comprised between 2 and 10 bar, more preferably of around 7 bar. The fluid inlets 21, 22 are configured in such a way that the high pressure fluid injected through them by the injecting means 41 is converted into a high velocity jet, which is driven into the container or containers. Typically, the diameter of the fluid inlets is comprised between 1 mm and 4 mm, more preferably between 1.5 mm and 3 mm. The fluid inlets 21, 22 preferably comprise a yieldably cover over it which can be pierced by the injecting means 41. The injecting means 41 also comprise a toroidal ring, preferably made of rubber, ensuring that there is no leakage of fluid outside the fluid inlet while the injecting means 41 are injecting fluid into the fluid inlet. Each fluid inlet is communicated with the inside volume of the container through an injection hole (in FIGS. 2c, 3c, 4c, 6c, 7d for example, a primary injection hole 24 corresponds to the primary fluid inlet 21 and a secondary injection hole 25 corresponds to the secondary fluid inlet 22): each of these injection holes has a diameter of at most 1 mm, preferably of at least 0.24 mm, preferably comprised between 0.3 mm and 1 mm, preferably between 0.3 and 0.5 mm, more preferably of about 0.4 mm. With such a configuration, the high pressure fluid injected by the injecting means 41 is conveyed internally in the fluid inlet towards the injection hole, from which it is converted into a high velocity jet of fluid injected inside the container when passing through the small section injection hole. Typically, this jet of fluid provided in the container has a velocity of at least 20 m/s.

The fluid jet which is created inside the container avoids that the food or beverage product flows through the dispensing outlet too rapidly: therefore, the time of agitation of the ingredient together with the fluid inside the container volume is increased.

According to the invention, the fluid inlets can also be configured for providing an orientable high velocity jet into the containers, preferably at about 90° with respect to the fluid supply provided into the fluid inlets by the injecting means 41, though any other angle would be possible and comprised within the scope of the present application.

As described, the fluid inlets in the fitment assembly 20 are configured for introducing the fluid under the form of a jet in the inner volume of the containers. By jet it is understood a stream of liquid or fluid that comes out of the fluid inlet and into the inner volume of the food or beverage container quickly and with force. Therefore, the fluid inlet is configured for introducing fluid in the inner volume of the container with a high velocity, this fluid jet preferably presenting a velocity of at least about 20 m/s, preferably at least 30 m/s. As previously described, such a configuration is preferably obtained in the present invention by placing a constriction (that of the injection hole) in the fluid path in the fluid inlet to reduce the size of the section of the fluid inlet. Due to the small surface of the injection hole through which the fluid goes into the inner volume of the container, the pressurized fluid creates a jet in the inner volume of the container.

The small surface of the injection holes presents the advantage of avoiding any back flow of fluid from the inner volume of the container into the fluid inlet. For the same fluid to be provided through the fluid inlets, the surface of the injection hole can vary according to the nature of the food and beverage ingredient inside the container which is to be mixed with the fluid. In particular when the ingredient is difficult to dissolve a smaller injection hole creates a jet with a higher velocity which improves agitation and dissolution of this ingredient in the container.

Preferably, according to the invention, the pack 10 presents a plane shape oriented along a plane essentially vertically oriented during beverage production and the fluid inlet orientates the jet of fluid in a direction comprised in said plane. The fluid jet introduced from the bottom into the container is developing into circular and spiral movements creating turbulences, frictions and high contact surfaces between the fluid molecules (typically, water molecules) and the ingredient particles. In average the fluid molecules have several turns within the container until they leave it together with the beverage or food product once mixed. Best results (reconstitution) have been observed with a pack of rectangular shape. Packs with single spout assembly placed in the corner of a rectangular pack have also been found to improve reconstitution.

According to the invention, the food or beverage containers are arranged essentially vertically during the production and dispensing of the single or multiple product, and the fitment assembly 20 is arranged in such a way that the fluid coming through the fluid inlets is supplied into the containers in an upward direction.

The fitment assembly 20 of the invention is preferably configured under rotational symmetry of order 2, also called 2-fold rotational symmetry or discrete rotational symmetry of the second order, with respect to a longitudinal central axis: therefore, the fitment assembly 20 is reversible and can be operated in one sense or the other in a machine. The preferred embodiments of the invention are those of rotational symmetry of order 2, i.e., where n=2, but other embodiments of the fitment assembly 20 having rotational symmetry with different values of n would also be possible and comprised within the scope of the present application. The fitment assembly 20 can be made of two substantially identical composing parts attached together or it can be made of only one composing part. For a certain embodiment or configuration, similar outer shape and similar external configuration as to fluid inlets and injecting and piercing means are provided by either the fitment assembly 20 made of two composing parts or made of one single composing part, which allows that any of them can be used in the same machine or device.

Figure 2B:
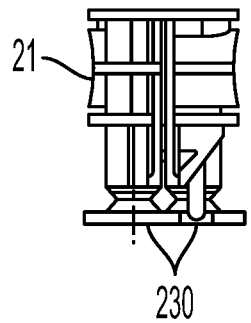
Figure 2C:
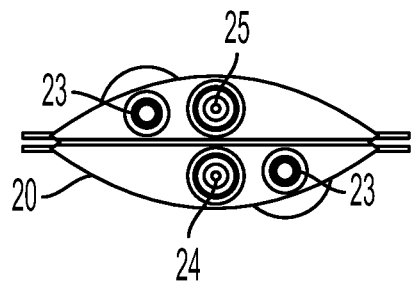

Different preferable embodiments are therefore possible, as shown for example in FIGS. 2a-b-c to 7a-b-c-d, providing fitment assemblies 20 which are symmetrical and can therefore be used in a device 40 in one sense of introduction or the other. Symmetry is provided as to fluid inlets (where the fluid is injected) and also as to piercing (typically the means injecting fluid in the fitment assembly are also piercing an external protective lid or cover as it will be detailed in what follows). Some of these preferred embodiments for the fitment assembly 20 are:

FIGS. 2a-b-c show a first embodiment, where the fitment assembly 20 comprises two composing parts 201, 202 attached together that are exactly identical: they are not symmetrical or mirror parts, but they are exactly the same. Preferably, this fitment assembly 20 is used together with two containers, 10' and 10", one of the configuring parts 201 being attached to a primary container 10', and the other configuring part 202 being attached to a secondary container 10".

Figure 3A:
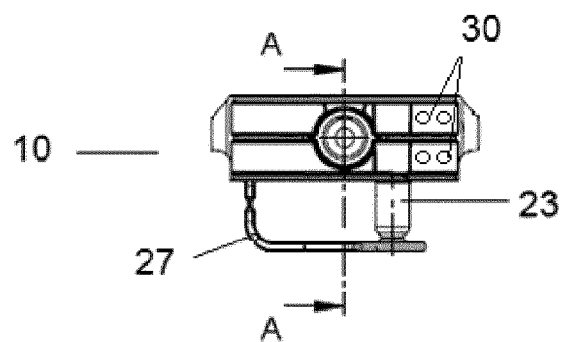
FIGS. 3a, 3b and 3c show different views of a second possible embodiment of a fitment assembly for a pack to be used in a system for preparing food or beverages according to the present invention.
Figure 3B:
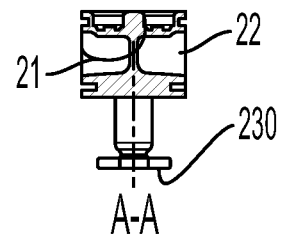
Figure 3C:
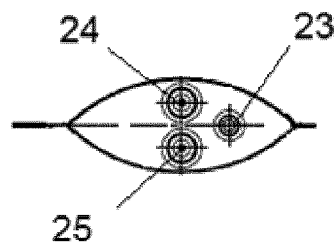

FIGS. 3a-b-c show a second embodiment, similar to that of FIGS. 2a-b-c, but where the fitment assembly 20 is now made of a unitary composing part 201 instead. Preferably, the fitment assembly 20 is attached to only one container 10'. The resulting fitment assembly 20 of the first and second embodiments has similar outer shape and similar external configuration as to fluid inlets and injecting and piercing means, therefore allowing that the same device can process any of them.

Figure 4A:
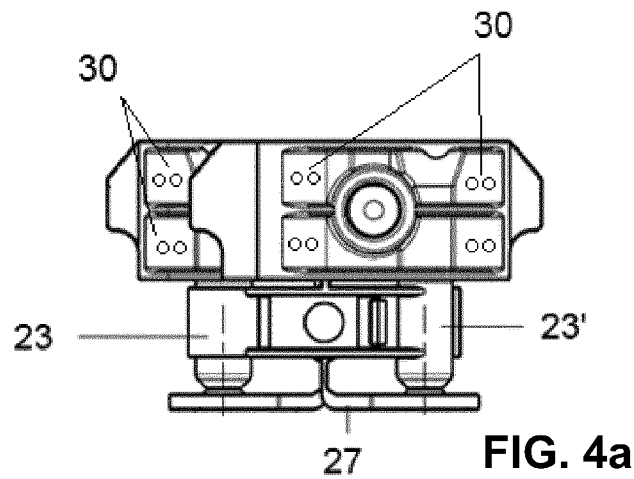
FIGS. 4a, 4b and 4c show a third possible embodiment of a fitment assembly for a pack to be used in a system for preparing food or beverages according to the present invention.
Figure 4B:
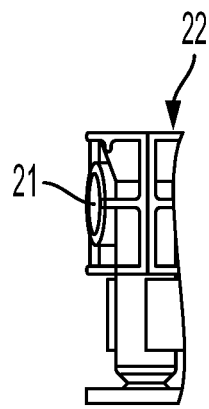
Figure 4C:
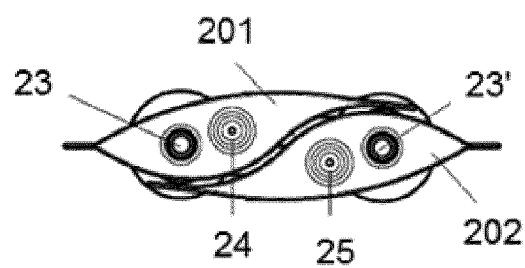

FIGS. 4a-b-c show a third embodiment, where the fitment assembly 20 comprises two composing parts 201, 202 attached together that are exactly identical, as for the first embodiment described in FIGS. 2a-b-c. Preferably, this configuration of fitment assembly 20 is used together with two containers 10' and 10", a primary container 10' attached to the primary composing part 201 and a secondary container 10" attached to the secondary composing part 202.

Figure 5A:
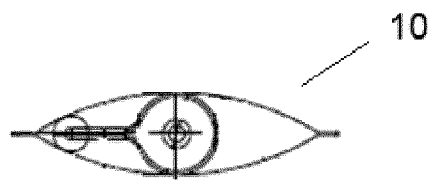
FIGS. 5a, 5b and 5c show a fourth possible embodiment of a fitment assembly for a pack to be used in a system for preparing food or beverages according to the present invention.
Figure 5B:
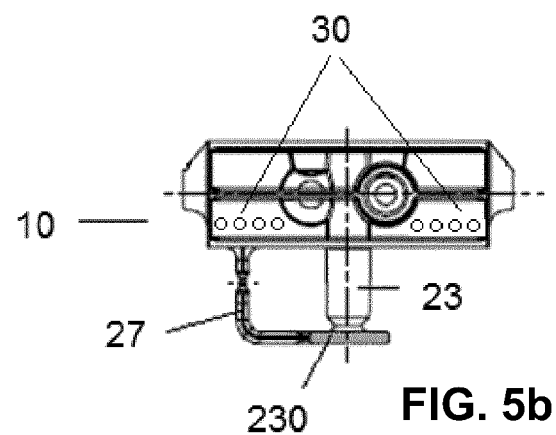
Figure 5C:
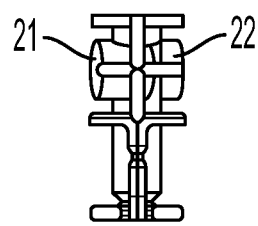

FIGS. 5a-b-c show a fourth embodiment, similar to that of FIGS. 4a-b-c but where the fitment assembly 20 is now made of a unitary composing part 201 instead. The resulting fitment assembly 20 of the third and fourth embodiments have similar outer shape and similar external configuration as to fluid inlets and injecting and piercing means, therefore allowing that the same machine can process any of them. Preferably, the fitment assembly 20 according to this fourth embodiment is attached to one primary container 10'.

Figure 6A:
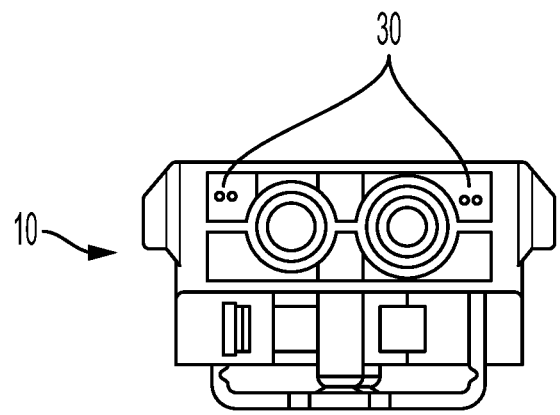
FIGS. 6a, 6b and 6c show a fifth possible embodiment of a fitment assembly for a pack to be used in a system for preparing food or beverages according to the present invention.
Figure 6B:
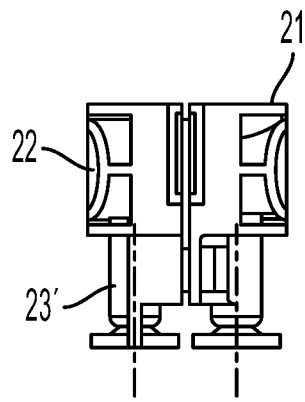
Figure 6C:
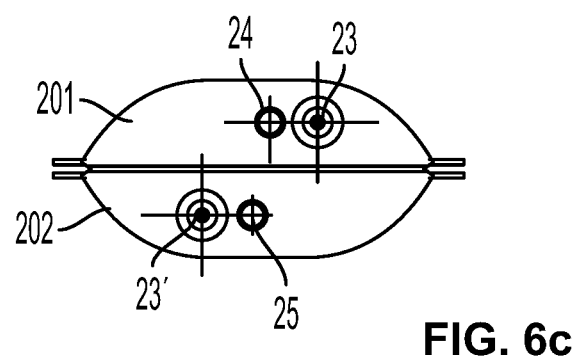

FIGS. 6a-b-c show a fifth embodiment, where the fitment assembly 20 comprises two composing parts 201, 202 attached together that are exactly identical, as for the first and third embodiments described previously. Preferably, the resulting fitment assembly 20 is used together with two containers, primary and secondary containers, 10' and 10" respectively, comprising the ingredients for the product to be dispensed.

Figure 7A:
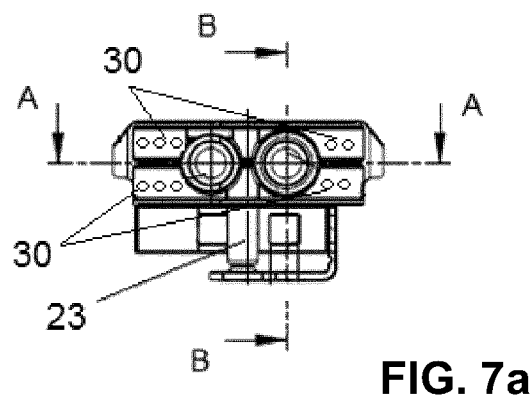
FIGS. 7a, 7b, 7c and 7d show a sixth possible embodiment of a fitment assembly for a pack to be used in a system for preparing food or beverages according to the present invention.
Figure 7B:
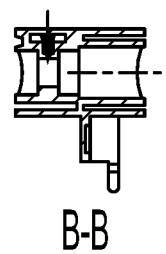
Figure 7C:
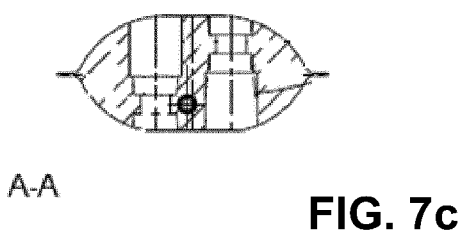
Figure 7D:
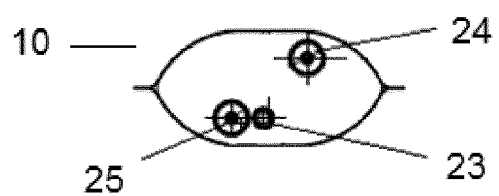

FIGS. 7a-b-c-d show a sixth embodiment, similar to that of FIGS. 5a-b-c, but where the fitment assembly 20 is now made of a unitary composing part 201 instead. The resulting fitment assembly 20 of the fifth and sixth embodiments have similar outer shape and similar external configuration as to fluid inlets and injecting and piercing means, therefore allowing that the same device can process any of them. Preferably, the fitment assembly 20 according to this sixth embodiment is attached to one primary container 10'.

Also according to yet another embodiment, the fitment assembly 20 can comprise a filter element 60 attached to it or as an integral part of the assembly, as represented for example in FIG. 8: this embodiment of the fitment assembly 20 is particularly useful when an infused product such as tea or a coffee beverage from roast and ground coffee is produced from the pack 10. In this case, the injecting means in the preparation device will introduce a fluid, typically water, inside the pack 10 through the fitment assembly 20, at a low pressure, typically less than 1 bar, more preferably at about 0.5 bar for the infusion of the beverage or for its extraction. As the pressure is low, there is no problem of tightness with the pack 10: the fluid is introduced by the injecting means in a continuous way during a certain time and under a certain flow rate: this information is comprised in the identification means 30. The fluid injected by the injecting means is hot, and is preferably provided at a temperature comprised between 60° C. and 95° C.

In this case, when the food or beverage product is infused, the fitment assembly 20 is configured differently from the one described, preferably as shown in FIG. 8: in this case, no jet is injected towards the upper part of the pack, but fluid in introduced through the primary fluid inlet 21 at a low pressure and is then conveyed upwardly through the inner part of the container where the food or beverage product is arranged and is infused. Once the product has been prepared in the pack, it is dispensed through the dispensing fluid outlet 23. The fitment assembly 20 is also configured to be reversible so that it can be pierced and fluid can be introduced frontally or reversibly.

Figure 10:
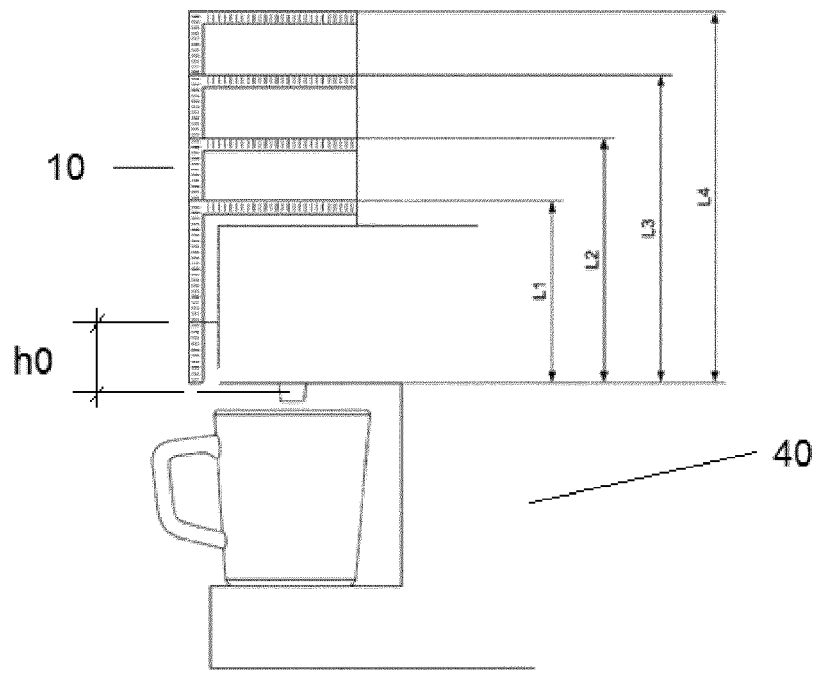
FIG. 10 shows an overview of the range of packs having different sizes which can be used in a system for preparing food or beverages according to the present invention.

Different sizes of the pack 10, as shown in FIG. 10 can be used in a same machine adapted to store different quantities of ingredients: typically, it is the configuration of the fitment assembly 20 as to external shape and piercing requirements of the fluid inlets what determines the machine to use; however, the size of the containers, when extending vertically, as shown in FIG. 10, does not determine or limit the machine. As a consequence, it becomes possible to produce different products, such as for example a cup of espresso coffee or a bowl of soup. The external design and configuration of the fitment assembly 20 will remain unchanged independently on the product targeted; however, the internal design of the fitment assembly 20, in particular as to the diameter of the injection holes will differ as a function of the ingredient to be processed and therefore as a function of the food or beverage product targeted. Also, other parameters such as the flow rate of fluid injected and/or the temperature of the fluid injected and/or the total volume of fluid injected for the single or plurality of containers will be modified as a function of the ingredient to be processed and therefore as a function of the food or beverage product targeted.

According to an embodiment of the invention the range of packs such as described above can comprise at least two types of packs essentially differing by their ability to produce a foamy beverage or a non-foamy beverage. The first type of pack that is able to produce a foamy beverage generally presents a water inlet configured for introducing a water jet in the inner volume of the pack with a higher velocity than the second type of pack. The first type of pack preferably presents a beverage outlet configured for keeping the beverage as long as possible in the inner volume of the pack. Then the injection hole of the first type of pack presents a dispensing outlet with a surface area equivalent to the surface of a circular surface of diameter smallest than for the second type of pack. The first type of pack also preferably presents a shape configured for improving the movement of the fluid and the beverage in the container during beverage or food preparation. It has been observed that rectangular containers presenting a ratio length/width of about 4/3 and with the fitment assembly 20 placed at the width side improve the agitation of the fluid and the generation of foam. This effect is even more accentuated when the fitment assembly 20 is positioned at the side corner of the width with the length. The foaming of the beverage can also depend from the nature of the food or beverage ingredient. The invention enables the production of a range of different packs 10 adapted for the agitation and dissolution of different types of beverage or food ingredients comprised in the containers.

The range of packs, independently on the food or beverage base ingredient contained, will all have a common lower part 200 of a height $h_0$ (as schematically shown in FIG. 10)

comprising the fitment assembly 20 and the identification means 30: the packs in the range of packs will thus differ from each other by the upper height above this lower common part 200 of height $h_0$.

Typically, the two flexible water impermeable sheets joined to one another to define the inner volume of the container are formed of one single flexible water impermeable sheet folded in half and joined at its free edges. According to said mode the container is a plane pouch made of a flexible material sheet, said sheet being folded at the top of the container and bonded on its edges to define the inner volume, the bottom bonded edge typically including the fitment assembly 20. This embodiment constitutes a particularly easy way to manufacture the pack 10 comprising the containers and the fitment assembly since it requires the cutting of only one piece of sheet—most preferably according to a rectangular shape—and its folding to create the inner volume for the food or beverage ingredient. Typically, also for manufacturing convenience, the fitment assembly 20 is introduced in the bottom edge of the container during the sealing of its edges.

The fluid inlets are typically enclosed in the complete pack 10 by the sheet(s) of material defining the inner volume of the containers: the yieldable cover over the fluid inlets piercable by the injecting means 41 is therefore made by the sheets of material covering these fluid inlets, so it is not necessary to prepare any supplementary cover or membrane to go over them, so the manufacturing is easy and convenient. Consequently the same piece of material can be used to simultaneously create the inner volume of the container and to close the fluid inlets. As such, the invention provides a pack 10 that is easy to manufacture and which guarantees hygienic and shelf life protection of the food and beverage ingredients and of the produced food or beverage product.

Preferably, the introduction of the fitment assembly 20 in the bottom edge of the container during the sealing of its edges to configure the complete pack 10 makes it possible that the flexible sheet can cover the part of the fitment assembly 20 including the fluid inlet. Consequently during the single step of bonding the edges of the sheet, it is possible to simultaneously create the inner volume for storing the food or beverage ingredient, place the fitment assembly 20 and close the fluid inlet. Preferably the dispensing outlet is not covered by the sheet. Yet it can be visually hidden by a part of the sheet e.g. by a skirt of the sheet.

The food or beverage containers preferably comprise at least one, more preferably two sloped areas (not shown) symmetrically arranged presenting slanted shapes in the vicinity of the fitment assembly 20 converging towards the fitment assembly 20, which enhance and facilitate the dispensing of all the product inside the container through the dispensing outlet, such that a minimized quantity of it can be left inside the container, therefore avoiding that beverage or food ingredients remain blocked in these corners. The sloped areas 11 can be obtained by sidewise sealing the corners of the containers. The food or beverage containers can present various external shapes like rectangular, square or round shapes. The inner volume of these containers would preferably present a shape configured for improving the movement of the fluid and the food or beverage ingredient in the container during product preparation.

The pack 10 comprises identification means 30 comprising the information on the process parameters to be applied to the food or beverage base ingredients so that an optimised product is delivered. Preferably, the identification means 30 comprise punched holes configuring a punched-hole code which comprises the information on the process parameters to be applied, depending on the food or beverage base ingredients. Punched-hole codes are particularly simple and inexpensive to produce.

According to the invention, the punched holes are preferably arranged in the fitment assembly 20 in different parts or locations, as shown for example in FIG. 2a, 3a, 4a, 5b, 6a, 7a or 8. The identification means 30 can be arranged either on one of the sides of the fitment assembly 20 with respect to the primary fluid inlet 21 and/or the secondary fluid inlet 22, I.e., being arranged either left or right of the primary fluid inlet 21 and/or the secondary fluid inlet 22, or on both sides of any of them (i.e. located both left and right of them). Moreover, it can also be partly located on one of these sides and be continued on the other side (typically, when the pack comprises a plurality of containers, the information on the identification means is extensive and therefore is divided within the fitment assembly 20).

The information on the fitment assembly will be preferably arranged in such a way that it can be reversibly read when the pack is arranged in the corresponding preparation device. For this reason, the identification means 30 will be preferably arranged reversibly in the fitment assembly 20 therefore being preferably arranged both frontally and in the rear part of the fitment assembly such that the information can be read independently of the sense in which the pack has been introduced in the preparation device. The code configuring the identification means 30 will be arranged in this case symmetrically, frontally and in the rear part thus providing the same information to the data reader in the device in both cases. In fact, the fitment assembly according to the invention is configured such that it can be reversibly pierced (to introduce the corresponding fluid into the container) and the information on the identification means can be also reversibly read, independently on the sense in which the pack has been introduced/arranged in the preparation device. This implies major advantages from the consumer's part, as the user does not need to pay attention to the sense of introduction of the pack in the device.

Typically, the identification means 30 (i.e. the punched-hole code) can be arranged in any or in all of the free areas 301, 302, 303 or 304 shown in the attached FIG. 2a, 3a, 4a, 5b, 6a, 7a or 8: depending on the size of the code (which depends on the amount of information that needs to be provided by the pack) the arrangement of the code is made in the mentioned free areas 301, 302, 303, 304; several different exemplary embodiments of such an arrangement of information is shown in the Figures cited. It is also possible that the code is placed in the above-mentioned free areas such that it is repeated a number of times, which therefore minimizes the possibility of errors or of the code being damaged. Typically, the internal configuration of the fitment assembly 20 as to fluid channels etc. will delimit the positioning of the punched-hole code through: therefore, when the identification means need to be reversibly read in the device, they need to be arranged on both sides, frontal and rear, of the fitment assembly 20.

Besides, the code is arranged in an area of the pack where there is no product preventing the punching of the code and where the process of food or beverage preparation does not disturb this positioning of the identification means 30.

Also according to the invention, the identification means 30 also comprise specific information on the sense in which the pack has been introduced: in fact, the code comprises specific information on the side on which it is being read by the appropriate means in the preparation machine or device. That is to say, one part of the code will be telling the side on which you are reading, either if you are reading the right side or the left side of the code with respect to the primary fluid inlet and/or the secondary fluid inlet.

With the above-mentioned configurations a code that comprises more information on the process parameters to be applied and/or that provides information on a higher number of possible food or beverage products to be obtained is also possible: even more, the fitment assembly 20 will be common for a range of packs having a common lower part 200 covering a height up to $h_0$ as it can be seen in FIG. 10.

The identification means 30 comprise information on the parameters to prepare the food or beverage product, typically at least the temperature of the fluid injected/introduced in the pack, the total volume of fluid and the fluid flow introduced. When there is a plurality of containers, these identification means 30 will comprise these parameters for each one of the containers configuring the pack (the code being made longer and therefore being preferably divided in the free areas of the fitment assembly).

Another possibility is that the identification means 30 comprise the information on a certain recipe, such that the machine will then have stored certain recipes to apply specific parameters (temperature, fluid flow and total fluid volume) depending on the recipe read.

The holes configuring the punched-hole code can be of any desired shape: preferably, they will be circular, but other shapes such as rectangular, square, triangular, polygonal or any other will also be suitable. The punched holes are made of any desired shape as a function of the area available in the free areas 301, 302, 303, 304 where they are arranged.

In the punched-hole code of the invention, the different encoding of information is preferably done by binary encoding. The device 40 used together with the pack 10 for preparing the food or beverage products will comprise a data reader 50 which will be confronted to the identification means 30 (i.e., to the punched-hole code) once the pack 10 is introduced in the device 40. The data reader 50 will be either configured as an optical sensor or as a mechanical sensor. When configured as an optical sensor, the data reader will comprise a light emitter device emitting light passing through the punched holes configuring the identification means 30.

When the punched-hole code is divided and arranged on both sides of the fitment assembly 20 with respect to the primary fluid inlet 21 and/or the secondary fluid inlet 22, as previously described, the sensor will then be provided with a primary sensor (reading the part of the code arranged in one of the sides, right or left) and with a secondary sensor (reading the part of the code arranged on the other side of the pack, left or right). Independently on the sense of introduction of the pack in the device, the data reader 50 will be configured to retrieve information from both sides of the fitment assembly 20 where the code is arranged when the fitment assembly 20 is aimed at being made reversibly read. Because the code will be preferably repeated a number of times, the possibility of errors is highly minimised.

When the data reader 50 is configured as an optical sensor, the holes will be identified by either being done closed or almost impenetrable to light or by having a punch or perforation which allows light to go through. The data reader 50 (or primary and secondary sensors) will be provided with a plurality of light barriers configured to receive the punched-hole code: the light barriers then allow optical reading of the code. Optical reading has the advantage that the code is read in an entirely contactless manner, which makes it possible to avoid mechanical parts which will be worn over and deteriorated after time or use.

According to another embodiment of the invention, the data reader 50 can be configured as a mechanical sensor: the punched-hole code will be then configured by the combination of open and closed holes and the data reader 50 will comprise for example a plurality of pins engaging with open holes in the code and will be pushed back by closed holes. It is also possible to use readers comprising electrical readers such that the pins engaging in the holes will additionally produce an electrical current.

In any of the embodiments defined above, whether the data reader is configured as an optical or as a mechanical sensor, in order to allow a proper reading of the punched-hole code, it is necessary that the code is correctly confronted with the data reader 50 when the pack 10 is introduced in the device 40. Because the code is directly arranged in the fitment assembly itself, the correct positioning of the identification means 30 with respect to the data reader 50 is directly achieved because the fitment assembly 40 works as a centring device of the pack 10 with respect to the device 40. Because the fitment assembly 20 of the pack needs to be correctly positioned in the device 40 so as to allow proper piercing and injection of the fluid by the injecting means 41 the correct positioning of the identification means 30 with respect to the data reader 50 will be designed dependent on this, so no further positioning holes will be needed.

Nonetheless, a further possibility would be to provide a centring device in the fitment assembly by way, for example, of centring holes.

When the pack 10 comprises a plurality of containers 10', 10", etc. in order to make a multiple product, the fitment assembly 20 brings together in this case the plurality of containers configuring the pack 10 (as shown schematically in FIGS. 1b or 1c, for example): therefore, the centring is thus done in the same way through the fitment assembly 20.

Also according to the invention, the identification means 30 in the pack 10 will also comprise information for the sequential fluid supply from the fluid inlets into the different containers, in case of a pack 10 comprising a plurality of containers 10', 10" etc. This sequential processing of the ingredients in the containers is done as a function of the recipe of the product targeted, so this information on which container should be processed in first place and in second place (typically when the pack 10 comprises two containers 10' and 10") is provided by the identification means 30 to the device or machine where the pack 10 is going to be processed. Because the fitment assembly 20 and therefore the pack 10 are reversible, the user can introduce the pack 10 in one sense or the other in the machine or device and the machine needs to be able to know in which sense the pack 10 has been actually introduced, so that a correct sequential processing of the containers configuring the pack 10 is done, this information being provided by the identification means 30 for the correct final product recipe targeted. Therefore, the identification means 30 need to be provided with the information on the sense in which the pack 10 was actually introduced by the user in the device 40.

The identification means 30 in the pack 10 will comprise the information on the process parameters to be applied by a device 40 where the pack 10 is introduced in order to prepare the food or beverage product in an optimised way. These process parameters are at least one or a combination of the following: temperature of the fluid introduced in the single or plurality of containers, total volume of fluid and fluid flow introduced in the single or plurality of containers. These parameters are also provided together with the information on the sequential processing of the single or plurality of containers configuring the pack.

Figure 11:
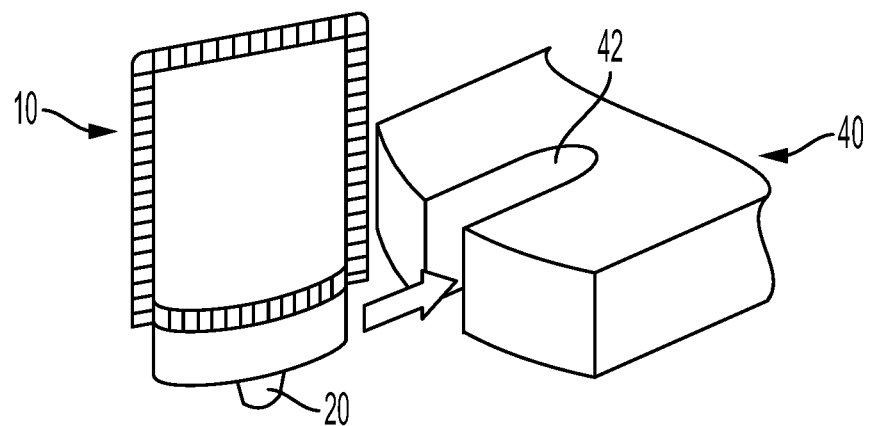
FIG. 11 shows a detail of a device in a system for preparing food or beverages according to the present invention, where the pack is introduced slidably laterally.
Figure 12:
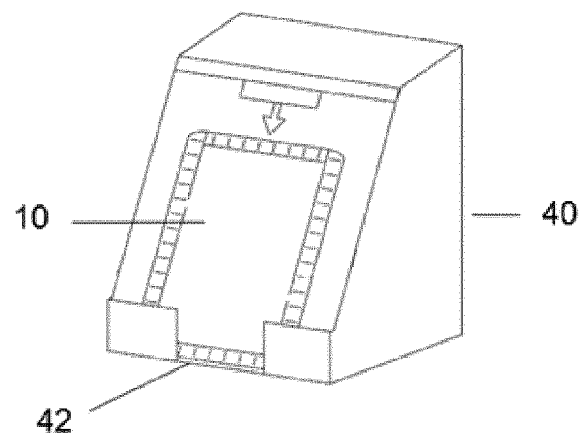
FIG. 12 shows a detail of a device in a system for preparing food or beverages according to the present invention, where the pack is introduced frontally.

According to yet another aspect, the invention refers to a device 40 for preparing single or multiple food or beverage products from a pack 10 as described previously. The device 40 comprises receiving means 42 adapted to accommodate the pack 10 preferably in such a way that the pack is positioned vertically and the fitment assembly is positioned at the bottom of the pack 10, and injecting means 41 (preferably also being piercing means, typically a fluid needle) designed for engaging with the fitment assembly 20 and for injecting fluid inside the fluid inlets of the fitment assembly 20. Typically, as the pack 10 is processed to obtain the beverage or food product in an essentially vertical position in the device 40, the pack 10 will be introduced either frontally in the device (as schematically represented in FIG. 12) or laterally, so that the pack 10 is slidably inserted into a dedicated insert in the device 40 (as schematically represented in FIG. 11).

According to the present invention, the fluid can be supplied to the pack 10 at any temperature, cold, ambient or hot, depending on the type of food or beverage product targeted.

Figure 9:
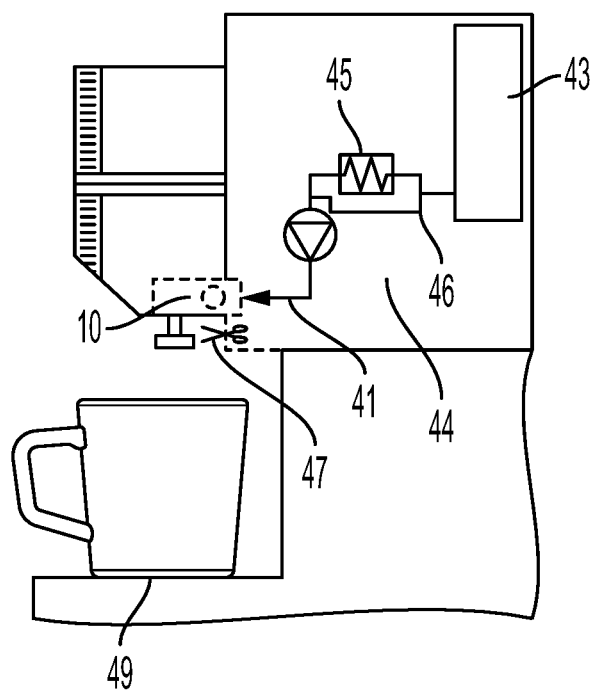
FIG. 9 shows a general view of the system for preparing food or beverages according to the present invention.

According to the invention and as schematically illustrated in FIG. 9, a device 40 for preparing food or beverage products from a pack 10 as described previously can also comprise:
- a fluid supply or tank 43 and a pump 44 for supplying fluid (pressurized or not) to the fluid inlets in the fitment assembly 20;
- a heater 45 for eventually heating the fluid;
- a bypass line 46 for delivering fluid at ambient temperature;
- a valve (not illustrated) for the selection of either hot or ambient fluid,
- optionally, a cooling unit (not shown) can also be provided in the device 40 for delivering cold fluid;
- injecting means 41, preferably piercing and injecting means, more preferably one or a plurality of fluid needles, piercing the fluid inlets and injecting the fluid coming from the fluid supply into the fluid inlets;
- optionally, a device 47 for cutting or tearing the plugs 27.

The device 47 for cutting or tearing the plugs 27 is preferably arranged in the device in such a way that the plugs are automatically cut when the pack 10 is introduced in the device or when the food or beverage preparation is activated.

The device 40 also comprises a data reader 50 (configured as an optical or as a mechanical reader) which reads and retrieves the information from the identification means 30 regarding the process parameters to be used for preparing the food or beverage product from the pack 10 (sequential processing of the single or plurality of containers, temperature, flow rate and total flow of fluid for the single or plurality of containers).

Preferably the device further comprises a positioning area 49 for allocating a drinking cup under the dispensing outlet of the pack 10 when a food product or a beverage is prepared.

Also as per the invention, a method for manufacturing a pack 10 such as described above, the pack 10 comprising a fitment assembly 20 and one or a plurality of food or beverage containers would comprise the steps of:
- folding a sheet of material and bonding both lateral edges of it to form a pouch;
- filling the pouch so formed through the remaining open edges with a food or beverage ingredient;
- positioning the fitment assembly 20 between the remaining open edges and bonding said edges, the fitment assembly 20 comprising already the identification means 30.

Some of the main advantages provided by the system of the present invention are now detailed herewith:
- a range of packs having a common lower part also provided with the fitment assembly which comprises the identification means is used in the same device, allowing a higher range of beverages and food products to be made in a same machine or device, such that these packs will differ from each other on the total height (considering that the pack is arranged essentially vertical when the food or beverage product is produced); this allows higher repeatability of parts and optimized manufacturing costs and replacement parts;
- because the code can be repeated a number of times, the possibility of error reading and of the code being damaged is highly minimized;
- the system is very easy and convenient to use by the consumer as it is reversibly conceived, which facilitates its use;
- because the code is arranged in a rigid part of the pack (the fitment assembly) the possibility of the code being damaged is highly minimized.

Although the present invention has been described with reference to preferred embodiments thereof, many modifications and alternations may be made by a person having ordinary skill in the art without departing from the scope of this invention which is defined by the appended claims.

LIST OF REFERENCES

100 System
10 Pack
10' Container
10" Container
10''' Container
20 Fitment assembly
30 Identification means
21 Primary fluid inlet
24 Primary injection hole
22 Secondary fluid inlet
25 Secondary injection hole
23 Primary dispensing fluid outlet
23' Secondary dispensing fluid outlet
230 Opening in primary fluid outlet
230' Opening in secondary fluid outlet
27 Plug
200 Common lower part in range of packs
$h_0$ Height of common lower part of range of packs
60 Filter element
301 Free area in the fitment assembly for the identification means
302 Free area in the fitment assembly for the identification means
303 Free area in the fitment assembly for the identification means
304 Free area in the fitment assembly for the identification means
40 Device
50 Data reader
51 Primary sensor
52 Secondary sensor
41 Injecting means
42 Receiving means
43 Fluid tank 44 Fluid pump
45 Heater
46 Bypass line
47 Device for tearing plugs
49 Positioning area

The invention claimed is:

1. A pack for preparing a food or beverage product, the pack comprising:
   at least one container having an inner volume where at least one base ingredient for the preparation of the food or beverage product is stored, the inner volume being defined by sheets of material joined to one another at edges thereof;
   a fitment assembly through which the food or beverage product is delivered, the fitment assembly being arranged on one side of the pack, comprising a fluid inlet comprising an injection hole into the fitment assembly, the fluid inlet is configured to allow fluid to enter the pack, and the fitment assembly further comprising a dispensing fluid outlet comprising an opening at a bottom of the fitment assembly; and
   an identification member comprising information on the food or beverage product to be prepared, the identification member being arranged in a free area of the fitment assembly where the identification member can be read, and wherein the identification member is arranged on both sides of the fitment assembly with respect to the fluid inlet such that part of the information of the food or beverage product is on one side of the fitment assembly and is continued on the other side of the fitment assembly.

2. The pack according to claim 1, wherein the identification member is arranged in the fitment assembly to be reversibly read independent of the orientation in which the pack has been introduced in a preparation device.

3. The pack according to claim 1 further comprising a plug configured to close the dispensing fluid outlet, wherein the plug is part of one single fitment assembly comprising the dispensing fluid outlet and the fluid inlet.

4. The pack according to claim 1, wherein the fluid inlet leads from an exterior of the container to the injection hole of the fitment assembly emerging into the inner volume of the container.

5. The pack according to claim 4, wherein the injection hole has a diameter between 0.24 mm and 1 mm.

6. The pack according to claim 1, wherein the dispensing fluid outlet is a straight tube oriented vertically in the fitment assembly.

7. The pack according to claim 1, wherein an opening of the dispensing fluid outlet has a diameter between 1 mm and 4 mm.

8. A pack for preparing a food or beverage product, the pack comprising:
   at least one container having an inner volume where at least one base ingredient for the preparation of the food or beverage product is stored, the inner volume being defined by sheets of material joined to one another at edges thereof;
   a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly; and
   an identification member comprising information on the food or beverage product to be prepared, the identification member being arranged in a free area of the fitment assembly where the identification member can be read, wherein the identification member is arranged on both sides of the fitment assembly with respect to the fluid inlet and comprises a plurality of times the information on the food or beverage product.

9. A pack for preparing a food or beverage product, the pack comprising:
   at least one container having an inner volume where at least one base ingredient for the preparation of the food or beverage product is stored, the inner volume being defined by sheets of material joined to one another at edges thereof;
   a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly; and
   an identification member comprising information on the food or beverage product to be prepared, the identification member being arranged in a free area of the fitment assembly where the identification member can be read, wherein the identification member is arranged in the fitment assembly to be reversibly read independent of the orientation in which the pack has been introduced in a preparation device, and wherein the identification member is arranged on a frontal part of the fitment assembly and on a rear part of the fitment assembly.

10. A pack for preparing a food or beverage product, the pack comprising:
    at least one container having an inner volume where at least one base ingredient for the preparation of the food or beverage product is stored, the inner volume being defined by sheets of material joined to one another at edges thereof;
    a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly; and
    an identification member comprising information on the food or beverage product to be prepared, the identification member being arranged in a free area of the fitment assembly where the identification member can be read, wherein the identification member comprises punched holes configured as a punched-hole code.

11. A pack for preparing a food or beverage product, the pack comprising:
    at least one container having an inner volume where at least one base ingredient for the preparation of the food or beverage product is stored, the inner volume being defined by sheets of material joined to one another at edges thereof;
    a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly; and
    an identification member comprising information on the food or beverage product to be prepared, the identification member being arranged in a free area of the fitment assembly where the identification member can be read, wherein the identification member is configured either as an optically-read code or as a mechanically-detected code.

12. A system for preparing a food or beverage product, the system comprising:
a pack comprising
at least one container having an inner volume where at least one base ingredient for the preparation of the food or beverage product is stored, the inner volume being defined by sheets of material joined to one another at edges thereof,
a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly, and
an identification member comprising information on the food or beverage product to be prepared, the identification member being arranged in a free area of the fitment assembly where the identification member can be read; and
a device where the food or beverage product is prepared, the device comprising a data reader configured to be confronted with the identification member in the pack when the pack is positioned in the device.

13. The system according to claim 12, wherein the data reader comprises a light emitter device to retrieve the information on the food or beverage product from the identification member in the pack.

14. The system according to claim 13, wherein the data reader comprises a plurality of pins engaging with the identification member in the pack.

15. The system according to claim 12, wherein the fitment assembly of the pack is configured to confront the data reader in the device with the identification member when the pack is positioned in the device.

16. The system according to claim 12 further comprising a plug configured to close the dispensing fluid outlet, wherein the plug is part of one single fitment assembly comprising the dispensing fluid outlet and the fluid inlet.

17. A pack for preparing a food or beverage product, the pack comprising:
at least one container having an inner volume where at least one base ingredient for the preparation of the food or beverage product is stored, the inner volume being defined by sheets of material joined to one another at edges thereof;
a fitment assembly through which the food or beverage product is delivered, the fitment assembly being arranged on one side of the pack, comprising a fluid inlet comprising an injection hole into the fitment assembly, and further comprising a dispensing fluid outlet comprising an opening at a bottom of the fitment assembly; and
an identification member comprising information on the food or beverage product to be prepared, the identification member being arranged in a free area of the fitment assembly where the identification member can be read, wherein the fluid inlet leads from an exterior of the container to the injection hole of the fitment assembly emerging into the inner volume of the container, wherein the fitment assembly has a top at an opposite end of the fitment assembly from the bottom, and the injection hole and an aperture into the dispensing fluid outlet are both positioned in the top of the fitment assembly.

18. The pack according to claim 17, wherein the fitment assembly comprises a side connecting the top to the bottom, and the fluid inlet opens to the exterior on the side of the fitment assembly.

* * * * *